Dec. 21, 1937.  S. P. VAUGHN  2,102,656
THERMOSTATIC DEVICE
Filed Feb. 8, 1936
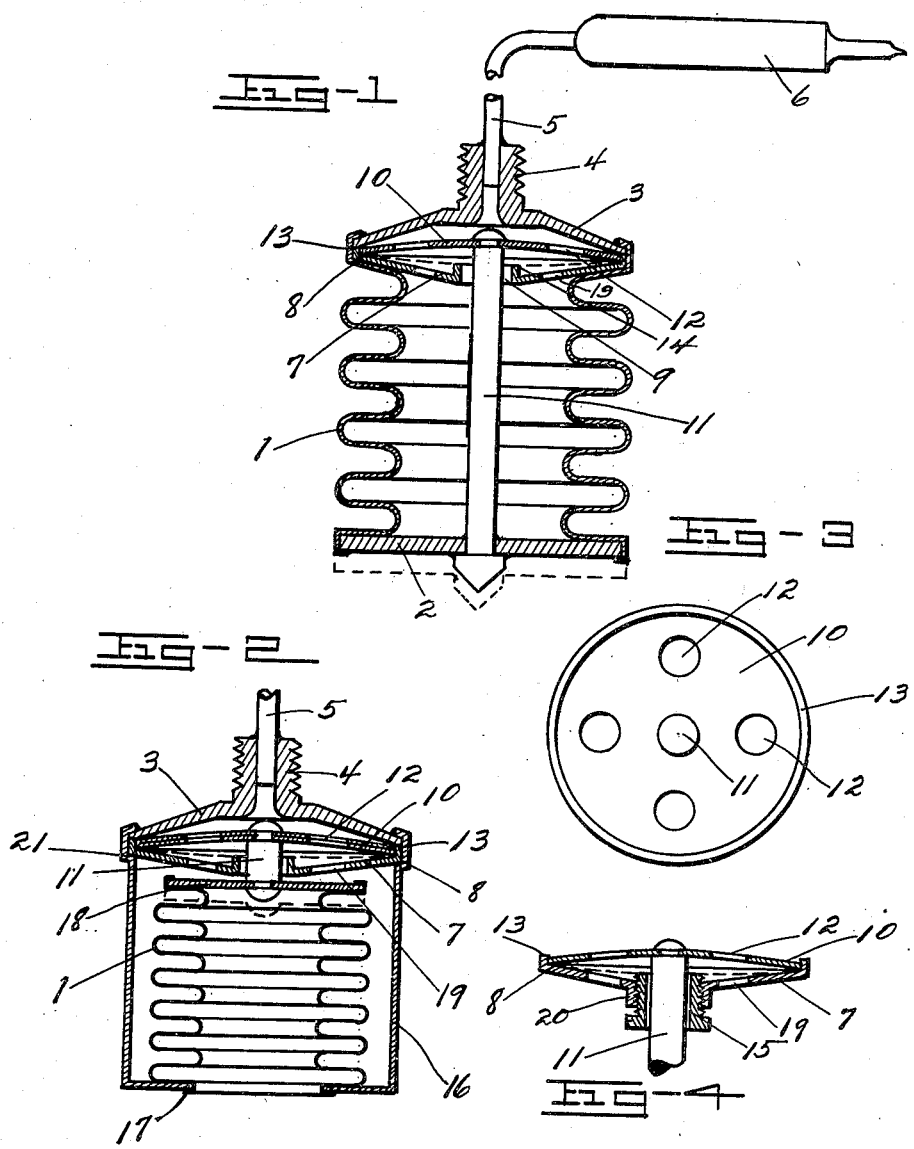
INVENTOR
SIDNEY P. VAUGHN
BY Robert A. Lavender
ATTORNEY Patented Dec. 21, 1937

2,102,656

UNITED STATES PATENT OFFICE 2,102,656

THERMOSTATIC DEVICE

Sidney P. Vaughn, United States Navy, Ackerman, Miss.

Application February 8, 1936, Serial No. 63,007

4 Claims. (Cl. 297—8)

(Granted under the act of March 3, 1883, as amended April 30, 1928; 370 O. G. 757)

The invention described herein may be manufactured and used by or for the Government of the United States of America for governmental purposes without the payment of any royalties thereon or therefor.

This application covers the subject matter of abandoned application Serial No. 646,122, filed December 7, 1932, on a Thermostat and improvements thereon.

The invention relates to a thermostat and more particularly to a thermostat having a snap action.

The principal object of this invention is to provide a flexible metallic thermostatic element which will expand and contract with a snap movement in response to temperature and pressure changes, to be used in the operation of valves, electric switches, etc., where a snap movement is desired.

In my construction I employ a flexible metallic bellows or diaphragm, closed at both ends, and formed with a number of annular folds or convolutions, which expands and contracts in length in response directly to changes in internal pressure, which, in the case of temperature controls, is created by the employment within the bellows of a thermo-sensitive fluid. This type of bellows is used in many types of temperature and pressure controls. Heretofore the expansion and contraction has been gradual in response to temperature or pressure changes, making it necessary to employ various kinds of snap action devices between the bellows and the valve or switch in order to produce a snap movement in the valve or switch.

In this invention I provide within the bellows an overcenter spring or snap disc so arranged as to cause the bellows to expand and contract with a snap movement instead of expanding and contracting with a gradual movement, thus simplifying the construction of the thermostatic devices in which employed.

A further object is to provide either fixed or adjustable means whereby any degree of sensitiveness in the action of the bellows may be obtained, said means also acting to limit the expansion or contraction of the bellows, and the pressure differential between the two snap positions.

With the above and other objects in view, the invention may be said to comprise the construction illustrated in the accompanying drawing, hereinafter described, and set forth in the appended claims, together with such variations and modifications thereof as will be apparent to those skilled in the art to which the invention appertains.

Reference should be had to the accompanying drawing forming a part of this specification, in which Fig. 1 is a longitudinal sectional view of the snap acting thermostatic element embodying my invention.

Fig. 2 is a longitudinal sectional view of a modified form of Fig. 1.

Fig. 3 is a plan view of the snap disc and holder.

Fig. 4 is a longitudinal sectional view of the snap disc and holder.

Like figures refer to like parts throughout the several views.

Referring to the drawing, Fig. 1 illustrates one form of the snap acting thermostatic element embodying my invention, in which numeral 1 designates a flexible metallic bellows, formed with a number of annular folds or corrugations, containing a thermo-sensitive fluid which causes the bellows to expand and contract in response to temperature or pressure changes. The lower end of the bellows is closed by a disc head 2, and the upper end of the bellows is closed by a disc head 3 having a threaded tubular boss 4 extending upwardly and provided for assembling the element in the casing in which it is to be used. Extending from the tubular boss is a tubular member 5 which connects the bellows with a bulb 6 which also contains some of the thermo-sensitive fluid.

A dished plate holder 7, flanged upwardly at its periphery and around a central opening 9, is clamped between the edge of the upper disc head 3 and an annular internal shoulder formed in the upper end of the bellows. The flanging of the plate holder 7 forms an annular shoulder 8 between the plate holder and the disc head, on which rests an over-center spring element or snap disc 10, comprising a convexo-concave disc of spring material, the center of which may be actuated from one to the other of two opposed limited positions with a snap action.

The disc may be so formed that when it is snapped into a reverse form it will have the property of regaining its original form when the pressure snapping it into a reverse or concavo-convex form is reduced, or, it may be so formed that it will remain in a reverse or concavo-convex form until forced back by a pressure applied in the opposite direction.

In the drawing the snap disc is placed in the head of the bellows with the convex side upward, and its center is connected to the bottom head 2 by a rod 11, which prevents the bellows expanding until the internal pressure is such that it will cause the snap disc 10 to snap into a reverse form, at which time the bellows will expand with a snap action, the disc and the lower head attaining a position as indicated by the dotted lines. The snap disc 10 is provided with holes 12 to permit free passage of the expansible fluid from one side of the disc to the other.

The upper edge 13 of the peripheral flange of the plate holder 7 acts as a shoulder 13 for the edge of the disc head 3 to rest upon in assembling the parts, thus preventing the edge of the disc head being forced down against the edge of the snap disc and binding it to such an extent that its action would be sluggish or retarded. Holes 19 are provided in plate holder 7 so as to permit free movement of the fluid therethrough and prevent any valve action which might retard the operation.

The upper edge 14 of the flanged central opening 9 in the plate holder acts as a stop which limits the downward movement of the center of the snap disc. This stop may be adjustable as indicated in Fig. 4 by a threaded sleeve 15 which is screwed into a flange 20 extending downward from the plate. In addition to acting as a stop, it also acts as a means for regulating the temperature or pressure differential between one snap position and the other. If the disc is allowed to snap past dead center, its tendency to return to its normal form when the pressure is reduced is much less pronounced than would be the case if the movement was stopped before reaching dead center. As an illustration, assume that it requires a ten pound pressure within the bellows to snap the disc and that the movement of the center of the disc is limited by the stop to a point where the disc will snap back to its original form when the pressure is reduced to say nine pounds. The pressure differential is one pound. Now if we allow the center of the disc to move still further toward dead center by unscrewing the stop, the pressure would have to be reduced still more before the disc would snap back to its original position. From the above it will be seen that the movement of the center of the disc must be limited to that which will produce the desired differential between the two snap positions, especially since it is very difficult to obtain uniformity of action in snap discs, due to various causes in manufacturing methods and processes.

In Fig. 1 the pressure is applied inside the bellows and it expands with increase in pressure. In Fig. 2 I show a modified form of construction employing the same snap principles except that the mechanism is assembled inside of a cup 16 and the pressure within the cup causes the bellows to contract or collapse. The lower end of the bellows is fastened to and soldered to the inner edge of a flanged or ring portion 17 of the lower part of the cup. The upper end of the bellows is closed by a disc head 18 which is connected by a rod to the central portion of a double snap disc 10, supported by the plate holder 7 which rests on an annular shoulder 21 formed in the internal wall of the cup. It will be noted in this construction that two snap discs are used.

Any number of discs may be used to form a laminated disc which is highly desirable in thermostatic elements of this type where it is desired to obtain a very strong snap action. I prefer to use one or more discs sufficiently strong to resist expansion or contraction of the bellows at the minimum operating temperature or pressure.

The snap movement of the bellows may be used either direct to operate valves and switches, or, it may be amplified by any suitable lever system connecting the moving end of the bellows with the valve or switch to be operated.

Fig. 4 illustrates clearly the assembly of the snap disc in its dished plate holder 7 together with the adjustable stop 15. In manufacturing the thermostatic element, the disc is placed in the holder and the stop adjusted at a point which will produce the desired differential between the two snap positions. The disc is kept with the plate holder until the two are assembled within the bellows. This insures uniformity in action in all the thermostatic elements adjusted for the same differential between the two snap positions, which is highly desirable in all thermostatic devices. The adjustment makes it possible to obtain any desired differential between the two snap positions.

It will be understood that many modifications and various arrangements may be made in the construction of the snap acting thermostatic element described herein without departing from the principles of the invention and the spirit and scope of the following claims.

I claim:

1. A thermostatic device of the character described comprising a flexible metallic bellows arranged to expand or contract in length in response to pressure changes, a snap acting spring element within said bellows, means for supporting the edges of said spring element in the walls of one end of said bellows, and means connecting the central portion of said spring element to the other end of said bellows, whereby when the bellows expands or contracts the spring element will be snapped from one position to the other and cause the bellows to expand or contract with a snap action.

2. A thermostatic device as described in claim 1 and adjustable means for limiting the movement of the central portion of the spring element.

3. A thermostatic device of the character described comprising a metallic bellows closed at both ends and arranged to expand or contract in length in response to pressure changes, an annular shoulder formed in the walls of one end of the bellows, a dished plate having a flanged edge extending upwardly and resting upon the annular shoulder between the annular shoulder and the top closure, a convexo-concave snap acting spring disk supported on said dished plate, and means connecting the central portion of the snap acting disk with the other end of the bellows, whereby, when the bellows expands or contracts in response to pressure changes, the snap acting spring disk will be snapped from one position to the other and cause the bellows to expand or contract with a snap action.

4. A snap acting device as described in claim 3 and an adjustment carried by said dished plate whereby the movement of the central portion of the snap acting spring disk may be limited.

SIDNEY P. VAUGHN.